United States Patent [19]

Streitberger et al.

[11] Patent Number: 5,071,454
[45] Date of Patent: Dec. 10, 1991

[54] PROCESS FOR THE REMOVAL OF A SOLVENT MIXTURE FROM A GAS STREAM

[75] Inventors: Horst Streitberger, Altötting; Achim Stankowiak, Burgkirchen, both of Fed. Rep. of Germany

[73] Assignee: Hoechst Aktiengesellschaft, Frankfurt am Main, Fed. Rep. of Germany

[21] Appl. No.: 547,640

[22] Filed: Jul. 2, 1990

[30] Foreign Application Priority Data

Jul. 5, 1989 [DE] Fed. Rep. of Germany ....... 3922023

[51] Int. Cl.$^5$ .............................................. B01D 47/00
[52] U.S. Cl. .............................................. 55/71; 55/84
[58] Field of Search ............... 55/68, 73, 71, 88, 84; 252/364

[56] References Cited

U.S. PATENT DOCUMENTS 3,877,893 4/1975 Sweny et al. ............................ 55/48
4,302,220 11/1981 Volkamer et al. ...................... 55/73
4,330,305 5/1982 Kuessner et al. ....................... 55/48

FOREIGN PATENT DOCUMENTS 0146886 7/1985 European Pat. Off. .
2300844 10/1981 Fed. Rep. of Germany .
1429396 3/1976 United Kingdom .

Primary Examiner—Bernard Nozick

[57] ABSTRACT

A process for the removal of polar and nonpolar solvents from a gas stream by contacting the gas stream with an absorption liquid in order to absorb the solvents from the gas stream is described, in which the glycol di-n-butyl ethers of the formula below

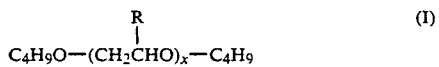

$$C_4H_9O-(CH_2\overset{R}{\underset{|}{C}}HO)_x-C_4H_9 \quad (I)$$

in which R is H or $CH_3$, and x is 1 to 8 are used as absorption liquid.

4 Claims, No Drawings

PROCESS FOR THE REMOVAL OF A SOLVENT MIXTURE FROM A GAS STREAM

DESCRIPTION

The invention relates to a process for the removal of polar and nonpolar solvents from a gas stream by contacting the gas stream with an absorption liquid from the group comprising alkylene glycol ethers in order to absorb the solvents from the gas stream.

It has been known for a long time to remove carbon dioxide and hydrogen sulfide from a gas stream containing these compounds by washing the gas stream with liquid alkylene glycol ethers as absorbents. Dimethyl ether, methyl isopropyl ether and $C_1$ to $C_4$-alkyl-tert.-butyl ether of ethylene glycols are described as advantageous alkylene glycol ethers, cf. British Patent 1,429,396, U.S. Pat. Nos. 3,877,893 and 4,330,305 and European Patent 0,146,886.

The U.S. Pat. No. 3,877,893 mentioned also discloses the use of ethylene glycol dimethyl ether as absorption liquid, in order to remove, in addition to the acid gases (carbon dioxide and hydrogen sulfide), also the nonpolar aromatic compounds benzene, toluene, and xylene from a gas stream.

German Patent 2,300,844 (Derwent reference V-52252) discloses that 1,2-dichloroethane can be washed out from a gas stream of the oxychlorination of ethylene and recovered by means of ethylene glycols or ethylene glycol $C_1$ to $C_4$-alkyl ethers.

In recent times, the purification of gas streams containing a mixture of one or more polar and one or more nonpolar solvents plays an ever increasing role. As is known, they are, as a rule, aromatic and/or aliphatic compounds from the group of alkanes, such as pentane, hexane, heptane and the like; cycloalkanes, such as cyclobutane, cyclohexane, cycloheptane and the like; aromatics, such as benzene, styrene, toluene, xylene and the like; alcohols, such as methanol, ethanol, propanol, isopropanol, butanol, hexanol, cyclohexanol and the like; ketones, such as acetone, methyl ethyl ketone, methyl isopropyl ketone, butanone, methyl isobutyl ketone, diisobutyl ketone, methyl isoamyl ketone, cyclohexanone and the like; ethers, such as diethyl ether, methyl ethyl ether, diisopropyl ether, dioxane, tetrahydrofuran, ethylene glycol monomethyl and monoethyl ether, mono- and diethylene glycol dimethyl and diethyl ether and the like; halogenated hydrocarbons, such as methyl chloride, methylene chloride, chloroform, carbon tetrachloride, ethyl chloride, dichloroethane, trichloroethane, trichloroethylene and the analogous other halogenated compounds, monofluorodichloromethane, monofluorotrichloromethane, trifluorotrichloroethane, tetrafluorodichloroethane, dichlorobenzene and the like; esters, such as ethyl acetate, butyl acetate, isobutyl acetate and the like; amines and amides, such as dimethylamine, triethylamine, acetamide, dimethylformamide, pyridine and the like.

The waste air charged with polar and nonpolar solvents originates from industrial processes and plants in which these organic compounds are prepared and/or used (painting and printing shops, sheet finishing, preparation and processing of adhesives and the like). The goal of treating the waste air consists in its purification and the recovery of the solvents present in the waste air stream (in general in the form of droplets or gases) and which represent more or less undesirable contaminations.

It has been found that the alkylene glycols and alkylene glycol ethers mentioned as purifying agents for the waste air charged with solvents of various types do not give the desired result. In particular in the case of combinations (mixtures) of polar and nonpolar aromatic and/or aliphatic compounds, their absorption effect leaves something to be desired. However, precisely these combinations are very frequently present in waste air streams.

Accordingly, the object of the invention is to propose a liquid absorbent for waste air streams affecting the purification of waste air streams of solvents of various types, in particular also in the case where solvents having a polar and those having a nonpolar character are present.

It has been found that alkylene glycol di-n-butyl ethers of the formula I below

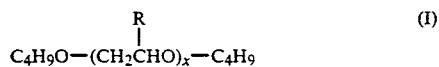

in which R is H or $CH_3$, preferably H, and x is 1 to 8, preferably 2 to 6, represent a particularly suitable and unexpectedly efficient absorption liquid for achieving the object in question.

Accordingly, the process according to the invention for the removal of polar and nonpolar solvents from a gas stream by contacting the gas stream with an absorption liquid from the group comprising alkylene glycol ethers in order to absorb the solvents from the gas stream uses glycol di-n-butyl ethers of the formula I mentioned as absorption liquid.

The representatives of the solvents in question mentioned above as examples are aromatic or aliphatic compounds having a polar or nonpolar (apolar) character. Those having a nonpolar character include, as is known, alkanes, cycloalkanes and aromatics, while, for example, alcohols are considered polar. A few additional examples for combinations of polar and nonpolar solvents are listed below:

diisopropyl ether and butanol; chloroform and methyl acetate; heptane and chloroform; heptane, acetone and ethanol; cyclohexane, methylene chloride and methanol; toluene, dimethylformamide and methanol.

The glycol dibutyl ethers to be used according to the invention, of which those of ethylene glycol are preferred, are known. They are usually prepared in such a manner that the corresponding alkylene glycol mono-n-butyl ethers are first reacted with sodium or an alkali metal hydroxide (in general in an excess of 20 to 200% by weight) to form the sodium alcoholate and then the sodium alcoholate is reacted with n-butyl chloride (which in general is also used in an excess of 20 to 200% by weight) to form the glycol di-n-butyl ether and sodium chloride. After the sodium chloride has been separated off, the crude product can be distilled, in the course of which unreacted starting compounds are removed if required and the desired pure glycol di-n-butyl ethers are obtained. As a rule, as is known, not a definite diether is obtained by itself, but a so-called mixture of homologues. In the process according to the invention, it is possible to use either a glycol di-n-butyl ether by itself or a mixture of two or more homologous ethers. It goes without saying that the homologues of higher molecular weight are more viscous than the homologues of lower molecular weight. From this, it follows that in the absorption temperature range customary in industrial practice rather homologues of a medium or higher molecular weight are used, whereas at lower absorbtion temperatures rather homologues of a relatively low molecular weight are used.

As for individual representatives of the general formula I, diethylene glycol dibutyl ether and triethylene glycol dibutyl ether are preferred (mostly for reasons of process engineering) In the case of mixtures of homologues, those are preferred which correspond to the composition given below, with reference to the formula I in which R is H and x is 2 to 6:

| x | Distribution of the molecular homologues in % by weight |
|---|---|
| 2 | 0 to 15 |
| 3 | 40 to 80 |
| 4 | 15 to 30 |
| 5 | 3 to 10 |
| 6 | 0 to 5 |

The process according to the invention can be carried out in detail by the same methods which are known for the treatment of gas streams using ethylene glycol dimethyl ethers as absorption liquid for removing acid gases. Accordingly, the process according to the invention is preferably carried out by (a) bringing the proposed alkylene glycol di-n-butyl ethers as absorption liquid into intimate contact with the gas mixture to be purified in an absorption zone (absorption column) and thus affecting removal of the solvents present in the gas stream by absorption and obtaining the purified gas stream and (b) removing the absorbed solvents from the absorption liquid in order to recover the solvents (desorption). The contacting of the waste air to be purified with the absorption liquid in the absorption zone can be carried out at a temperature below zero up to room temperature or at an elevated temperature and at atmospheric or superatmospheric pressure; preferably, it is carried out at a temperature from 0 to 50° C., it being preferred to use water vapor or nitrogen as stripping agent in the desorption zone (desorption column). The contacting of the waste air to be treated with the absorption liquid (the waste air washing liquid) can be carried out once or more than once.

The process according to the invention has a number of advantages. The proposed alkylene glycol di-n-butyl ethers have unexpectedly efficient absorption properties for solvents of a wide range of chemical structures and in particular also for solvent mixtures, for which reason the desired and frequently very low maximum allowable concentration limits are reached more or less easily. On the other hand, the physically bound solvents can also again be removed easily and recovered. The proposed glycol butyl ethers obviously have an optimum behavior in absorption and desorption of polar and nonpolar compounds and are therefore suitable in particular for these solvent mixtures Furthermore, they have a relatively high stability even at higher temperatures. Their stability can, if desired, be improved by incorporating stabilizers, in particular antioxidants. The compounds (additives) known for air and/or heat stabilization of glycols and glycol ethers are suitable also in this case, for example the compounds and mixtures of compounds described in German Patent Application 3,714,754 (Derwent reference 88-316223). An absorption liquid for solvents from waste air streams must have, on the one hand, a relatively low vapor pressure at the absorption temperature so as not to become itself a solvent component in the waste air and, on the other hand, a high vapor pressure (low boiling point) with regard to the desorption process. Also in regard of these requirements which are actually opposite to one another, the glycol dibutyl ethers proposed according to the invention also represent a particularly advantageous selection. The waste air streams to be purified by the process according to the invention can contain the solvents in question in a more or less large amount. As a rule, they are waste air streams having an overall solvent content of 1 to 500 g/Nm$^3$.

The invention will now be illustrated in more detail by way of examples.

EXAMPLE 1

775 Nm$^3$ of waste air charged with 18 kg of diisopropyl ether and 20 kg of n-butanol, i.e. waste air containing 23.3 g of diisopropyl ether and 25.8 g of n-butanol in 1 Nm$^3$ are passed through a packed column having six theoretical plates over a period of one hour, and 2,158 l of a mixture of di-n-butyl ethers of the ethylene glycol of the formula I having the following distribution of the molecular homologues characterized by the value of x are passed through the column in a counter-current:

| x | Molecular homologues in % by weight |
|---|---|
| 2 | 0.5 |
| 3 | 71.0 |
| 4 | 22.0 |
| 5 | 6.2 |
| 6 | 0.3 |

The absorption liquid (washing liquid) is employed at a temperature of 30° C. (it warms during the washing process to 35° C.). The washed and purified gas stream leaving the column has the following residual charge per Nm$^3$ of only:

Diisopropyl ether: 2.5 g
n-Butanol: 0.001 g

EXAMPLE 2

775 Nm$^3$ of waste air charged with 20 kg of chloroform and 20 kg of heptane, i.e. waste air containing 25.8 g of chloroform and 25.8 g of heptane in 1 Nm$^3$ are passed through the packed column used in Example 1 over a period of one hour, and 2,158 l of the ethylene glycol dibutyl ether mixture of homologues used in Example 1 is passed through the column in a counter-current. The washing liquid is employed at a temperature of 30° C. (it warms to 33° C. during the washing process). The washed and purified gas stream leaving the column has the following residual charge per Nm$^3$ of only:

Chloroform: 0.047 g
Heptane: 0.392 g

EXAMPLE 3

775 Nm$^3$ of waste air charged with 18 kg of diisopropyl ether and 6 kg of n-butanol, i.e. waste air containing 23.3 g of diisopropyl ether and 7.7 g of n-butanol in 1 Nm$^3$ are washed, as in Examples 1 and 2, with 2,265 l of diethylene glycol di-n-butyl ether at 10° C. (the washing liquid warms to 35° C.). The washed and purified gas stream leaving the column has the following residual charge per Nm³ of only:

Diisopropyl ether: 0.029 g
n-Butanol: 0.001 g

EXAMPLE 4

775 Nm³ of waste air charged with 18 kg of chloroform and 6 kg of heptane, i.e. waste air containing 23.3 g of chloroform and 7.7 g of heptane in 1 Nm³ are washed, as in Examples 1 and 2, with 2,265 l of diethylene glycol di-n-butyl ether at 10° C. (the washing liquid warms to 35° C.) The washed and purified gas stream leaving the column has the following residual charge per Nm³ of only:

Chloroform: 0.003 g
Heptane: 0.001 g

EXAMPLE 5

775 Nm³ of waste air charged with 20 kg of methylene chloride and 20 kg of diisopropyl ether, i.e. waste air containing 25.8 g of methylene chloride and 25.8 g of diisopropyl ether in 1 Nm³ are washed, as in Examples 1 and 2, with 7,883 l of tripropylene glycol di-n-butyl-ether at 20° C. (the washing liquid warms to 21.6° C.). The washed and purified gas stream leaving the column has the following residual charge per Nm³ of only:

Methylene chloride: 0.002 g
Diisopropyl ether: 0.010 g

We claim:

1. A process for the removal of polar and nonpolar solvents from a gas stream comprising the steps of:
contacting a gas stream containing at least one polar and nonpolar solvent mixture selected from the group consisting of diisopropyl ether and n-butanol, heptane and chloroform, and diisopropyl ether and methylene chloride, with an absorption liquid comprising an n-butyl ether of formula I below

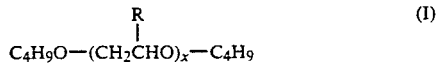

in which R is H or $CH_3$, and x is 2 or 6, and obtaining thereby a purified gas stream.

2. The process as claimed in claim 1, wherein, in said formula I, R is H.

3. The process as claimed in claim 1, wherein the absorption liquid of formula I comprises diethylene glycol di-n-butyl ether or triethylene glycol di-n-butyl ether.

4. The process as claimed in claim 1, wherein the absorption liquid comprises a mixture of ethylene glycol di-n-butyl ethers of said formula I in which the amount in % by weight of each ether, where x can vary from 2 to 6, is:

| ether, x = | wt. % |
|---|---|
| 2 | 0 to 15 |
| 3 | 40 to 90 |
| 4 | 15 to 30 |
| 5 | 3 to 10 |
| 6 | 0 to 5. |

* * * * *

UNITED STATES PATENT AND TRADEMARK OFFICE
CERTIFICATE OF CORRECTION

PATENT NO. : 5,071,454
DATED : December 10, 1991
INVENTOR(S) : Horst Streitberger, et al It is certified that error appears in the above-indentified patent and that said Letters Patent is hereby corrected as shown below:

In claim 1, column 6, line 12: "and x is 2 or 6" should read --and x is 2 to 6--.

In column 5, line 29: insert -- < -- before "0.010 g".

In column 5, line 17: insert -- < -- before "0.001 g".

In column 5, line 5: insert -- < -- before "0.001 g".

Signed and Sealed this

Twenty-sixth Day of October, 1993

Attest:

BRUCE LEHMAN

*Attesting Officer*  *Commissioner of Patents and Trademarks*